(12) United States Patent
Xu et al.

(10) Patent No.: US 7,990,658 B2
(45) Date of Patent: Aug. 2, 2011

(54) VOICE COIL MOTOR AND DISK DRIVE UNIT WITH THE SAME

(75) Inventors: YanChu Xu, San Jose, CA (US); JianFeng Xu, Dong Guan (CN); LingJun Kong, Dong Guan (CN); Lei Yu, Dong Guan (CN); Qiang Zhao, Dong Guan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 918 days.

(21) Appl. No.: 11/892,299

(22) Filed: Aug. 21, 2007

(65) Prior Publication Data
US 2009/0015968 A1 Jan. 15, 2009

(30) Foreign Application Priority Data
Jul. 9, 2007 (CN) .................. 2007 1 0127874.3

(51) Int. Cl.
*G11B 5/55* (2006.01)

(52) U.S. Cl. .................................................. 360/264.9

(58) Field of Classification Search ............... 360/264.2, 360/264.8, 264.3, 264.4, 265.9, 265.7, 245.9; 369/121
See application file for complete search history.

(56) References Cited

U.S. PATENT DOCUMENTS

| | | | | |
|---|---|---|---|---|
| 6,157,099 A * | 12/2000 | Hartman | ................... | 310/12.16 |
| 7,327,537 B1 * | 2/2008 | Oveyssi | ................... | 360/264.7 |
| 7,414,815 B2 * | 8/2008 | Fujimoto et al. | ........... | 360/264.7 |
| 2001/0048576 A1 * | 12/2001 | Kazmierczak | ............. | 360/264.7 |
| 2005/0122629 A1 * | 6/2005 | Nakamura et al. | ......... | 360/264.7 |
| 2005/0190505 A1 * | 9/2005 | Fujimoto et al. | ........... | 360/264.7 |
| 2007/0086117 A1 * | 4/2007 | Lee | ............................. | 360/264.7 |

* cited by examiner

*Primary Examiner* — Allen T Cao
(74) *Attorney, Agent, or Firm* — Nixon & Vanderhye P.C.

(57) ABSTRACT

A voice coil motor for a disk drive includes a permanent magnet, a voice coil adapted to move in an arc proximate to the permanent magnet, a top plate positioned above the voice coil, and a bottom plate positioned below the voice coil. The permanent magnet has two halves that are magnetized in opposite direction. The two halves of the magnet are split into a right half magnet portion and a left half magnet portion. The right half magnet portion and the left half magnet portion are attached to the top plate and the bottom plate respectively at opposite sides of the voice coil motor. The invention also discloses a disk drive unit with such VCM.

16 Claims, 11 Drawing Sheets

VOICE COIL MOTOR AND DISK DRIVE UNIT WITH THE SAME

This application claims priority to Chinese Application No. 200710127874.3 filed Jul. 9, 2007, the entire contents of which are hereby incorporated by reference.

FIELD OF THE INVENTION

The present invention relates to information recording hard disk drive devices, and more particularly to a voice coil motor (VCM) with a split permanent magnet for lowering cost of the VCM as well as reducing torsion generated on coil of the VCM.

BACKGROUND OF THE INVENTION

Disk drive devices are information storage devices that use magnetic media to store data and a movable read/write head positioned over the magnetic media to selectively read data from and write data to the magnetic media.

Figure 1A:
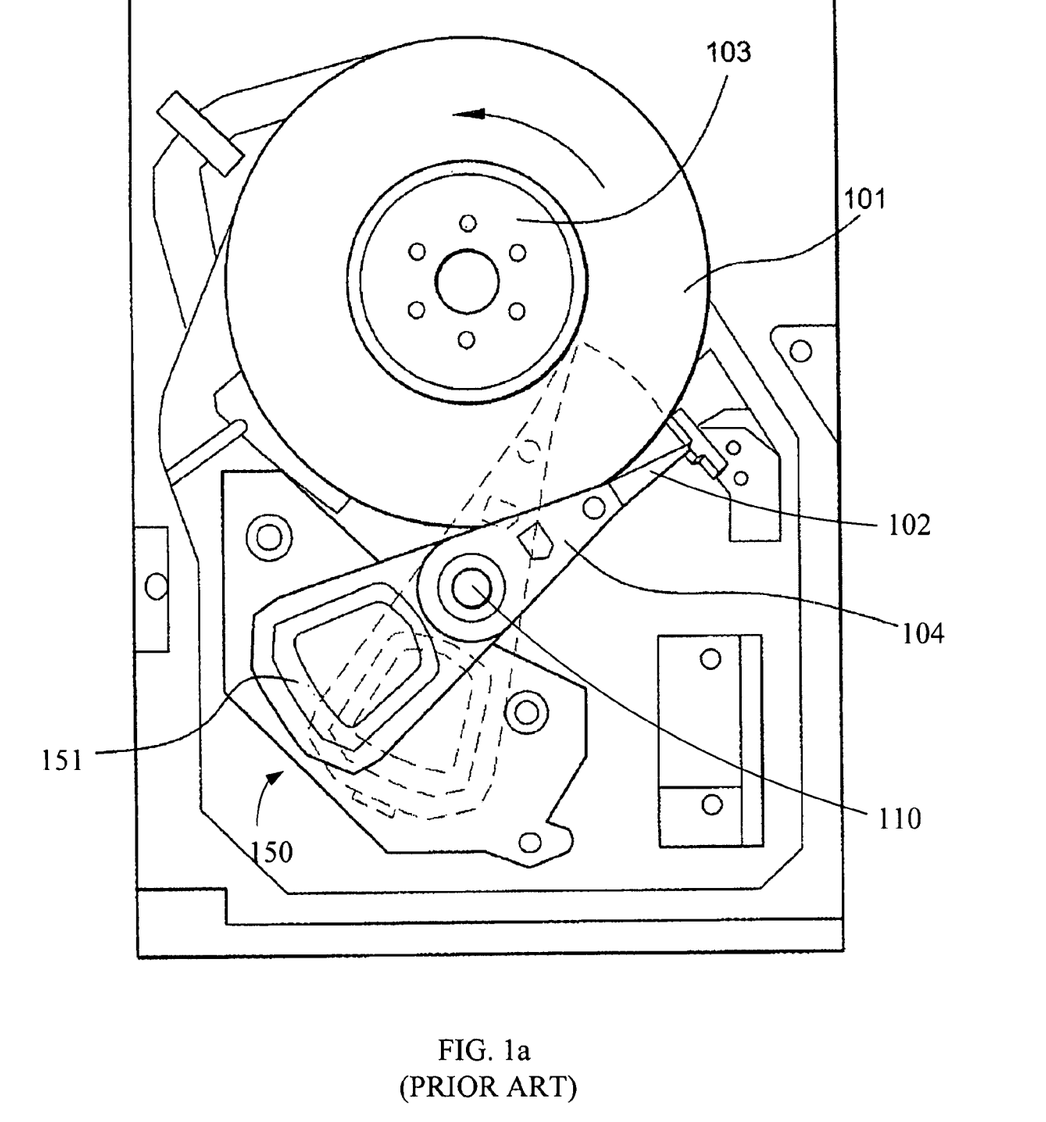
FIG. 1a is a plan view of a conventional disk drive device.

As shown in FIG. 1a, a conventional hard disk drive unit includes a magnetic disk 101 mounted on a spindle motor 103 for spinning the disk 101 at a constant high speed. A head gimbal assembly (HGA) 102 which includes a slider incorporating a read/write head (not shown) is actuated to move relative to the disk 101 so as to read data from or write data to the disk 101.

Typically, a VCM 150 is employed to actuate the HGA 102 so as to position the head with respect to the disk surface. The HGA 102 is mounted at a tip end of an actuator arm 104. The actuator arm 104 pivots about a cartridge bearing assembly 110 mounted to the disk drive base plate at a position closely adjacent to the outer extreme of the disk 101 so that the head moves in a plane parallel with the surface of the disk 101 and over data tracks of the disk 101.

The VCM 150 includes a coil 151 mounted radially outward from the cartridge bearing assembly 110, the coil 151 being immersed in the magnetic field of a magnetic circuit of the VCM 150. The magnetic circuit comprises one or more permanent magnet pairs and magnetically permeable plates. When a predetermined driving current flows through the coil 151, rotational forces or torques about the axis of the cartridge bearing assembly 110 are generated on the coil 151 as well as the actuator arm 104 by the interaction between the current and the magnetic field.

Figure 1B:
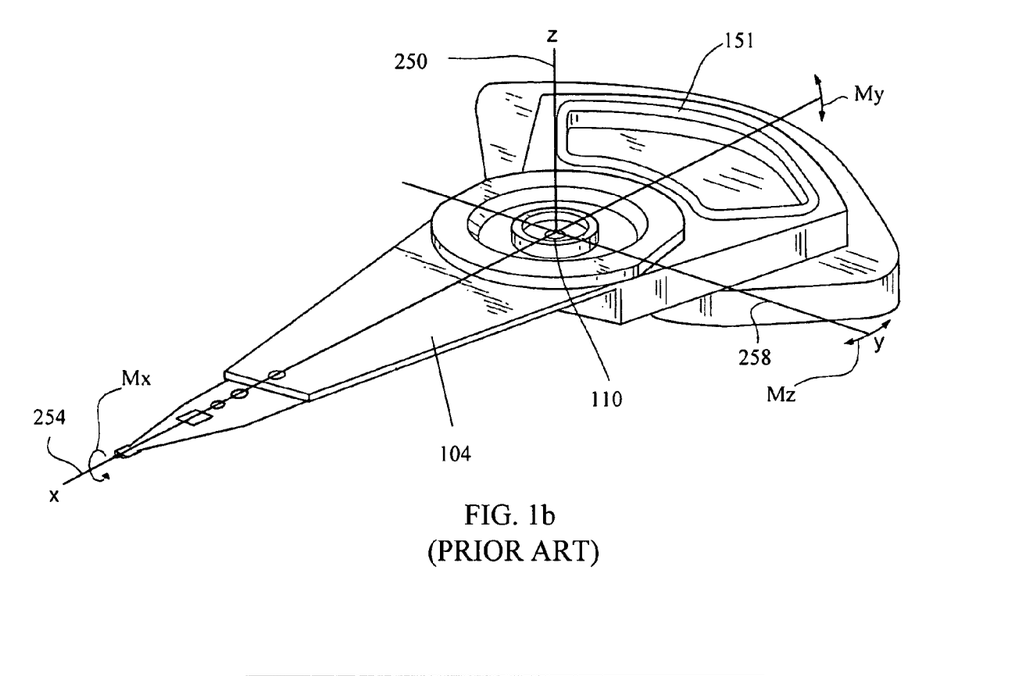

As shown in FIG. 1b, there are typically three principal torques experienced by the VCM and the actuator arm 104 as a result of the application of current to the coil 151. The first torque Mz (generated by force Fr as shown in the drawings), often called the main torque, causes the coil 151 and the actuator arm 104 to rotate about a z-axis 250 of the cartridge bearing assembly 110 in the plane X-Y. The second torque Mx (generated by force Ft as shown in the drawings), referred to as the torsion, causes the coil 151 and the actuator arm 104 to rotate or twist about an x-axis 254 of the cartridge bearing assembly 110. The third torque My, referred to as pitch torque, causes the coil 151 and the actuator arm 104 to rotate or bend about a y-axis 258 of the cartridge bearing assembly 110. As is known, the main torque Mz is the primary means by which the voice coil 151, and thus the head, is moved radially across the disk 101. Stated another way, the main torque Mz is a desired force which causes the actuator arm 104 and head to move in a plane parallel with the disk 101. In contrast, both the torsion Mx and pitch torque My cause motions in the actuator arm 104, the head, and the coil 151 which are not parallel to the plane of the disk 101. As such, the torques Mx and My affect the head slider's ability to maintain optimal flying height and to stay parallel to the disk over the data tracks, thereby interfering with the read/write operation of the head in the disk drive.

Figure 2:
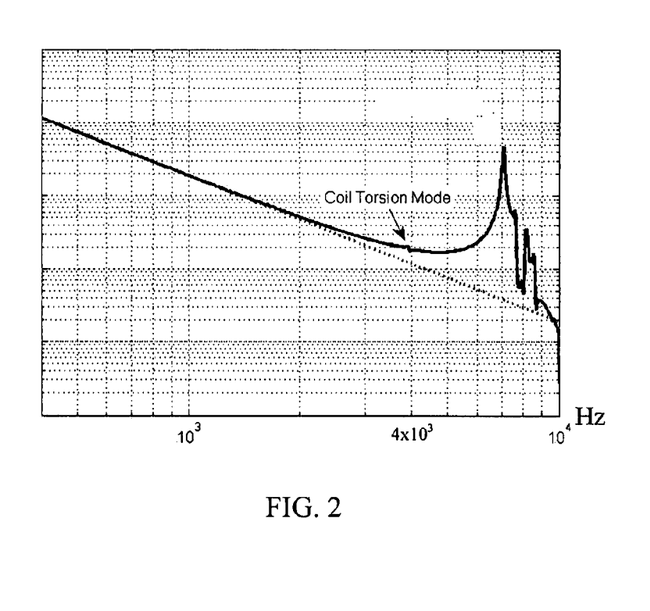
FIG. 2 is a graph illustrating a typical bode curve of a HSA with the VCM.

FIG. 2 shows a typical bode curve of a HSA. The curve can be viewed as the output/input ratio in frequency domain. The input is the electrical current applied on the coil, while the output is the lateral displacement between head and disk. The base line of the bode curve is a straight line with slope as −2, as shown by the dashed line. It can be observed that a peak exists at frequency 4 KHz, which corresponds to the coil torsion mode, and is caused mainly by Mx. This peak will adversely affect the slider's performance dramatically. Therefore, the coil torsion caused by the undesired torque Mx is very critical in VCM design, while the coil bend caused by the pitch torque My is less critical in VCM design.

Generally speaking, magnetic flux lines are representative of the magnetic fields generated by a permanent magnet or by a current flowing in a wire. With respect to permanent magnets, magnetic flux lines are typically represented by dashed lines that emerge from the magnet's north pole and enter the magnet's south pole. The density of the flux lines indicates the magnitude of the magnetic field generated by the magnet. If a magnetic conductive material, such as steel, is placed in a flux path, the magnetic flux will tend to pass through the steel rather than air surrounding the magnet, as the steel has a higher magnetic permeability.

Referring to FIG. 3b, FIG. 4b, FIG. 7 and FIG. 10, the dashed rectangle represents a transition zone, in which the magnetic flux changes direction from up to down. Thus, the magnetic flux in the transition zone is not vertical to the surfaces of the permanent magnets. This non-vertical magnetic flux will cause undesired force Ft and undesired torque Mx.

Figure 3A:
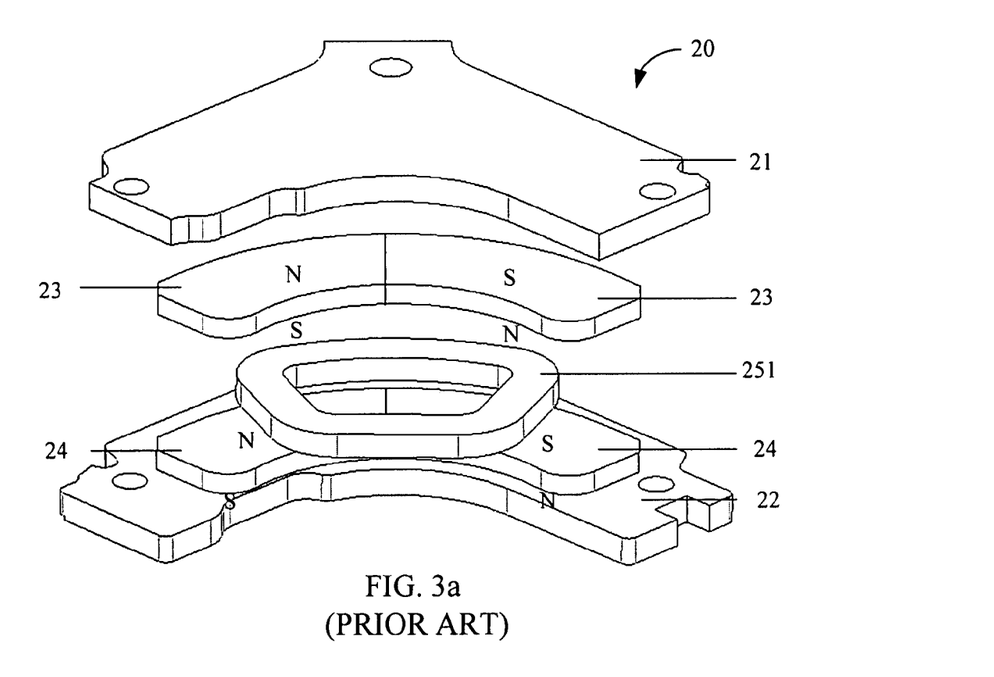
FIG. 3a is an exploded perspective view of a conventional dual magnet VCM.

FIG. 3a illustrates a conventional dual magnet VCM 20. The conventional dual magnet VCM includes a top plate 21, a bottom plate 22 arranged in spaced relation and parallel to the top plate 21. Two pieces of permanent magnets 23, 24 are attached to the plates 21 and 22, respectively, such that an air gap is defined between the magnets. A movable coil 251 is positioned in a magnetic field defined between the two pieces of permanent magnets 23, 24. Each piece of the permanent magnets 23, 24 is divided into two halves, which are magnetized in opposite direction.

Figure 3B:
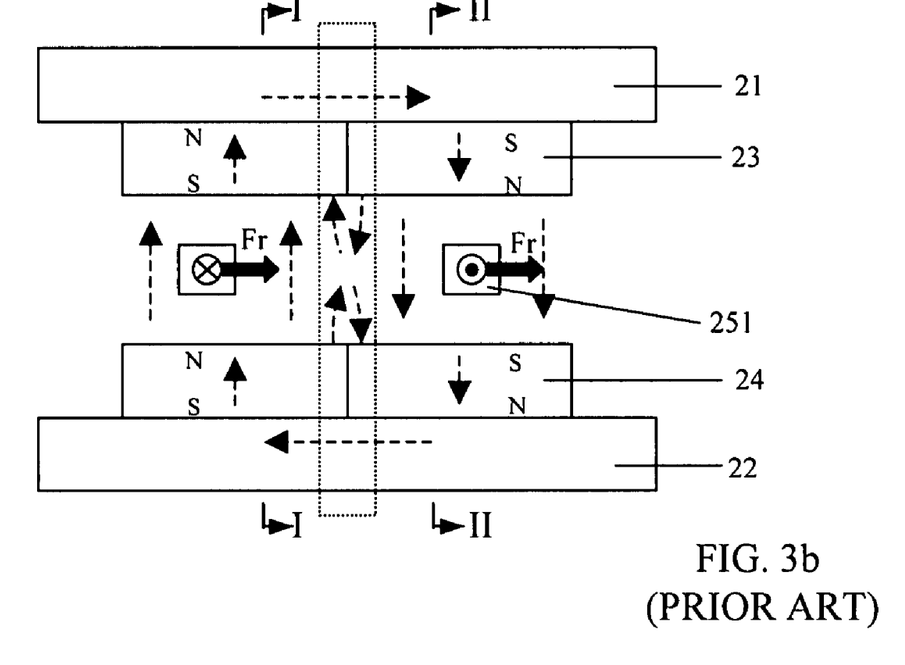
FIG. 3b is a front plan view of the VCM shown in FIG. 3a showing lines of magnetic flux.
Figure 3C:
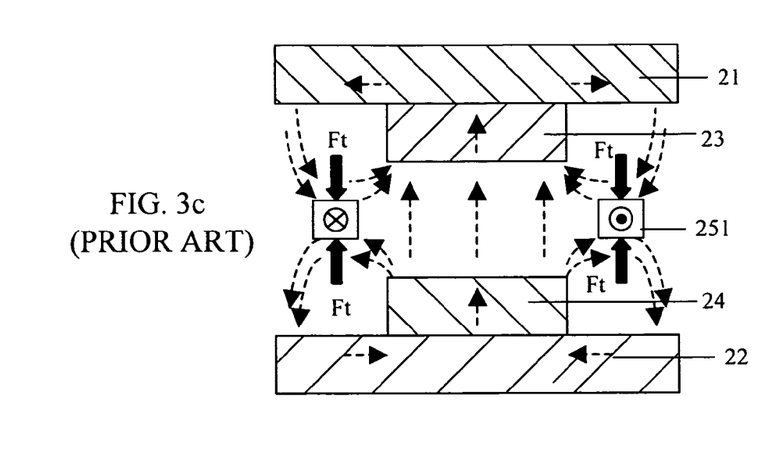
FIG. 3c is a cross-sectional view of the VCM shown in FIG. 3b, taken along line I-I of FIG. 3b.
Figure 3D:
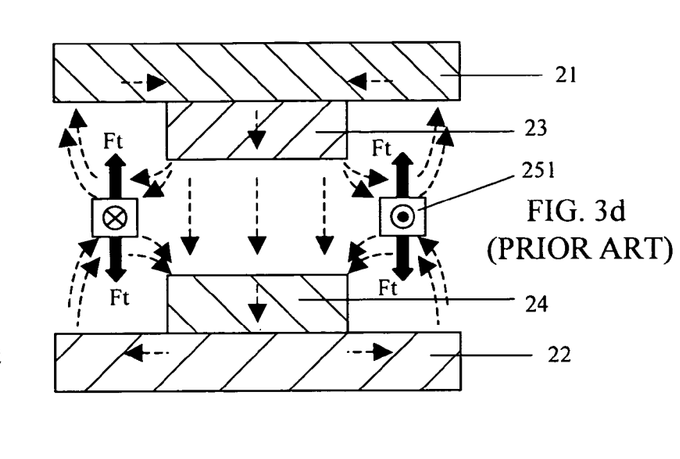
FIG. 3d is a cross-sectional view of the VCM shown in FIG. 3b, taken along line II-II of FIG. 3b.
Figure 3E:
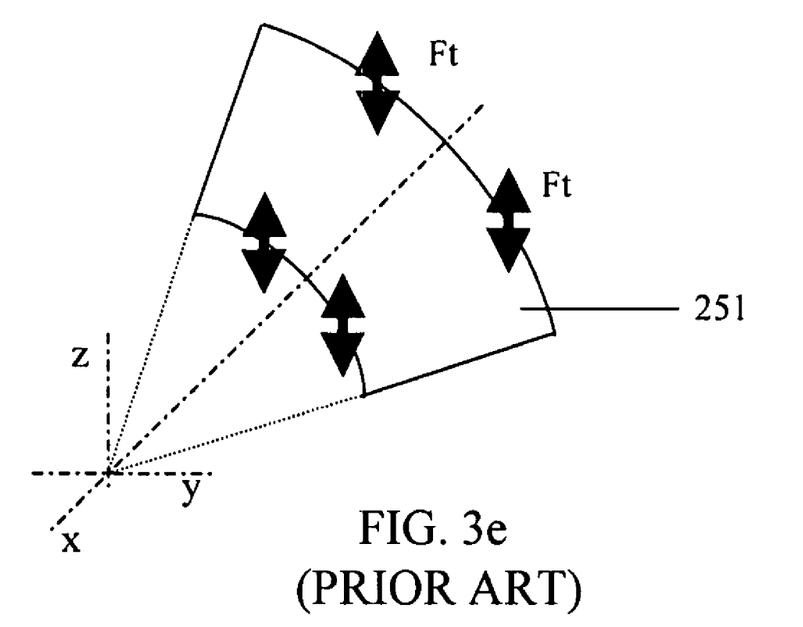

FIGS. 3b-3d illustrate the magnetic flux generated in the conventional dual magnet VCM by dashed arrows. Referring to FIG. 3b, in the air gap between the two permanent magnets 23, 24, lines of magnetic flux is almost vertical to the surfaces of the permanent magnets 23, 24. When a predetermined driving current flows through the movable coil 251, driving force Fr represented by the solid arrow is generated on the movable coil 251 according to the Fleming's left-hand rule by the interaction between the current and a magnetic field formed by the permanent magnets 23, 24, thereby driving the actuator arm to move. As shown in FIG. 3b, the transition zone of the dual magnet VCM is small and the vertical forces Ft generated on the coil 251 which cause undesired torsion Mx can cancel with each other. Put another way, when a predetermined driving current flows through the movable coil 251, the dual magnet VCM 20 suffers tiny or no torsion, as shown in FIG. 3e.

However, the cost of the dual magnet VCM is too high, as each dual magnet VCM must consume two pieces of permanent magnets. With the increase of the price of the permanent magnet, the HDD companies are trying to reduce the consumption of magnet material so as to lower the cost of VCM.

Under this condition, single magnet VCM that consumes only one piece of permanent magnet has come into being.

Figure 4A:
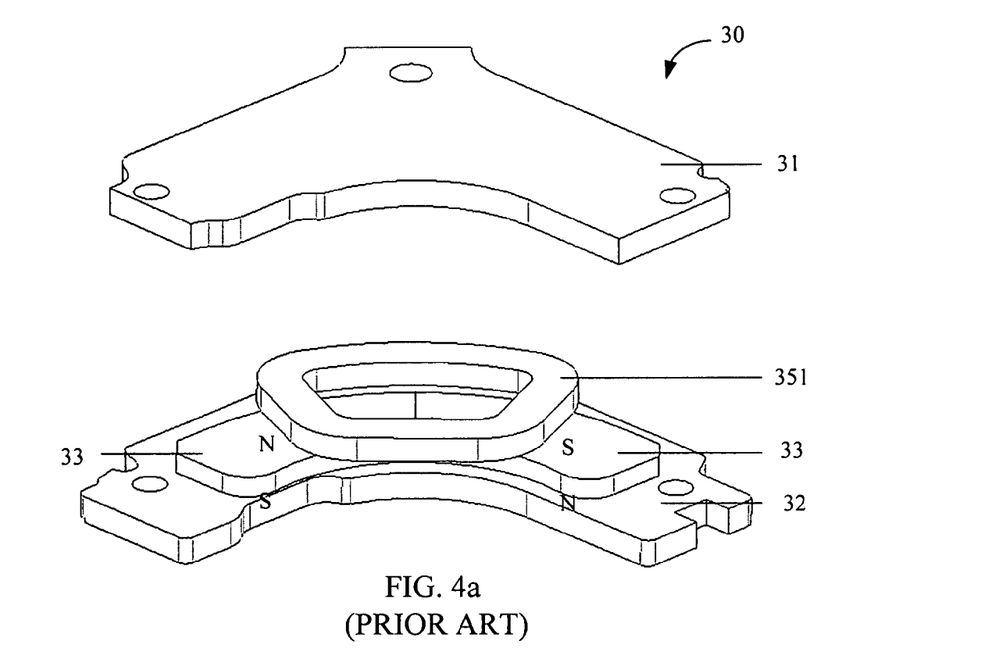
FIG. 4a is an exploded perspective view of a traditional single magnet VCM.

Referring to FIG. 4a, the basic structure of a traditional single magnet VCM 30 is similar to the dual magnet VCM 20 except that there is only one piece of permanent magnet 33 attached to the bottom plate 32 as a total in the traditional single magnet VCM 30. The permanent magnet 33 is also divided into two halves that are magnetized in opposite direction. The work principle of the traditional single magnet VCM 30 is also similar to that of the conventional dual magnet VCM 20. When a predetermined driving current flows through the movable coil 351, a driving force Fr represented by the solid arrow as shown in FIG. 4b is generated on the movable coil 351 according to the Fleming's left-hand rule by the interaction between the current and a magnetic field formed by the magnet 33 and the plates 31, 32, thereby driving the actuator arm to move.

Figure 4B:
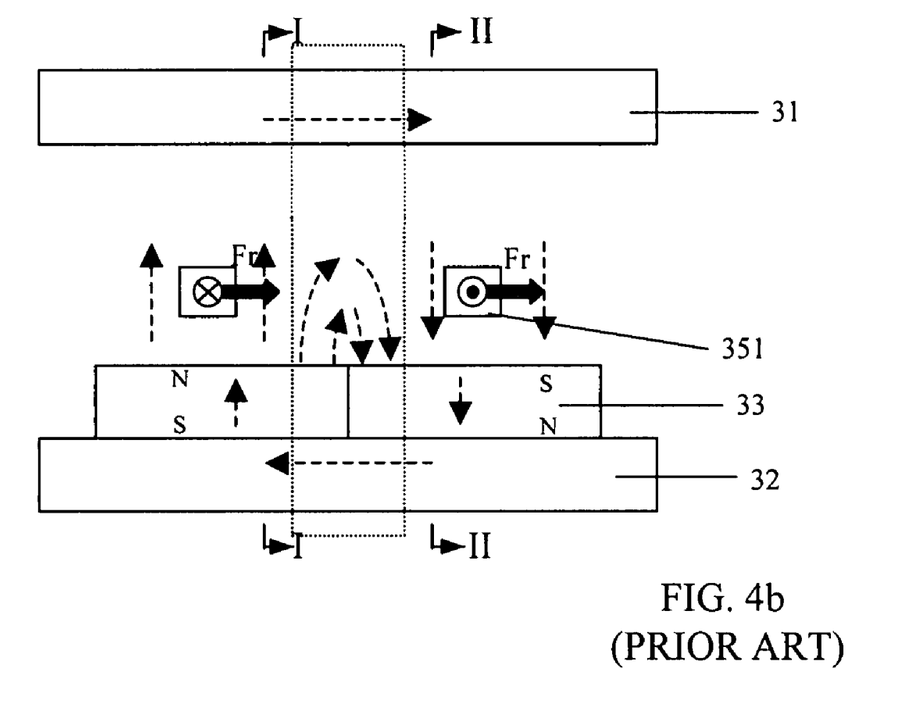
FIG. 4b a front plan view of the VCM shown in FIG. 4a showing lines of magnetic flux.
Figure 4C:
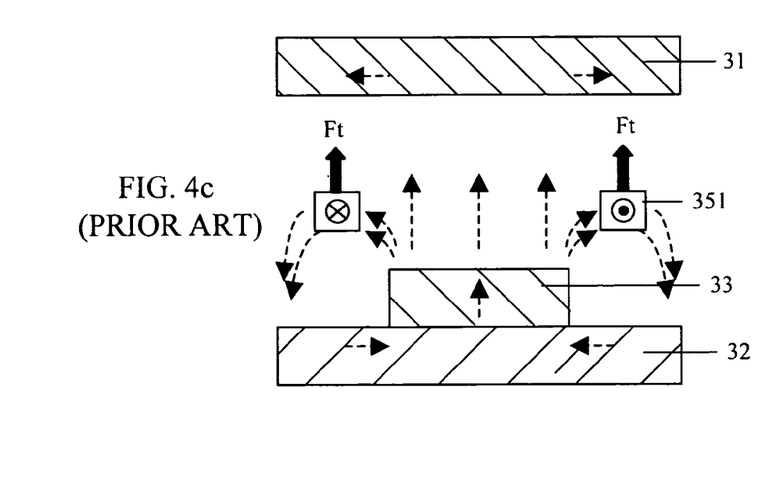
FIG. 4c is a cross-sectional view of the VCM shown in FIG. 4b, taken along line I-I of FIG. 4b.
Figure 4D:
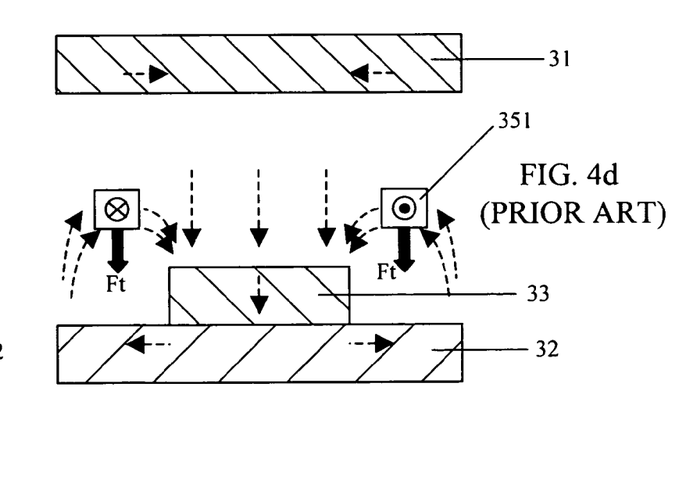
FIG. 4d is a cross-sectional view of the VCM shown in FIG. 4b, taken along line II-II of FIG. 4b.
Figure 4E:
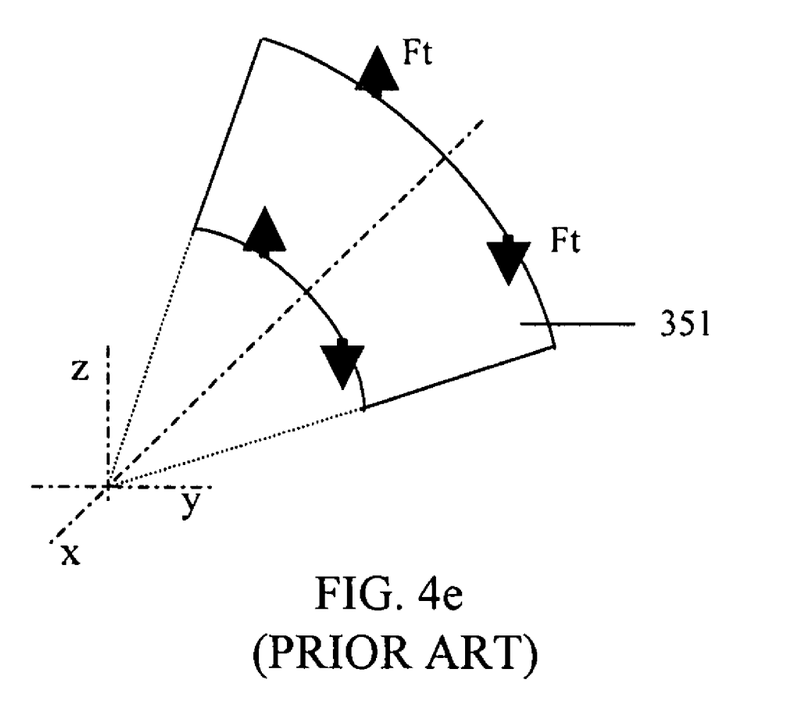

FIGS. 4b-4d show lines of magnetic flux generated in the traditional single magnet VCM 30. Although this VCM can lower the cost, the transition zone of the traditional single magnet VCM 30 is much larger than that of the dual magnet VCM 20 shown in FIG. 3b. Moreover, the vertical forces Ft generated on the coil 351 at opposite sides of the X-axis are at different direction, as best shown in FIG. 4e. These opposite vertical forces Ft cause a high torsion on the coil 351.

Figure 11:
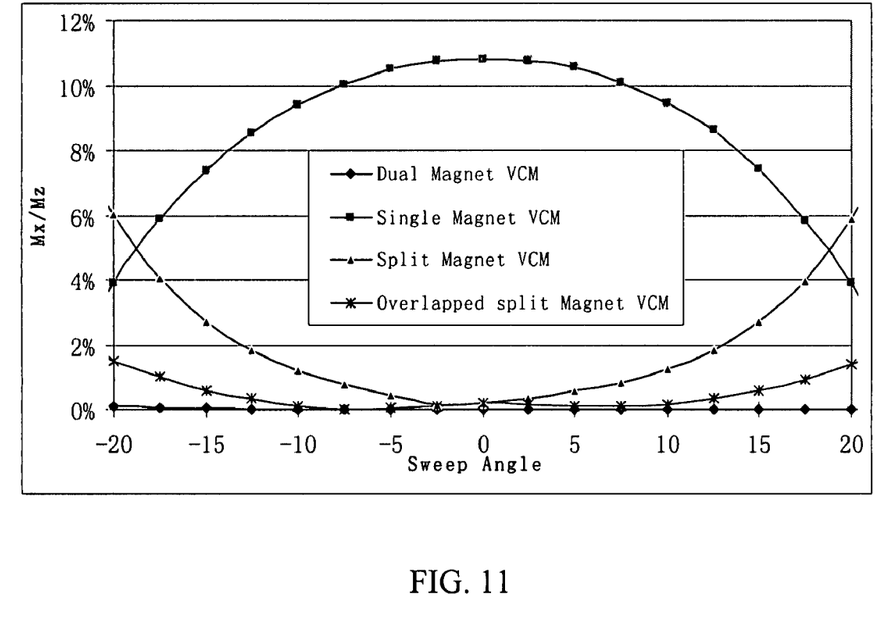
FIG. 11 shows testing data Mx/Mz of the traditional dual magnet VCM, the traditional single magnet VCM, the present split magnet VCM, and the present overlapped split magnet VCM.

Referring to FIG. 11, the figures prove that the traditional single magnet VCM suffers a serious torsion Mx.

Hence, a need has arisen for providing an improved VCM capable of reducing the cost of the VCM as well as the torsion generated on the coil of the VCM.

SUMMARY OF THE INVENTION

Accordingly, an objective of the present invention is to provide a VCM which utilizes a split permanent magnet to lower the cost of the VCM as well as reduce torsion in the VCM.

Another objective of the present invention is to provide a hard disk drive unit with a VCM which utilizes a split permanent magnet to lower the cost of the hard disk drive unit as well as reduce torsion in the VCM.

To achieve the above-mentioned objective, according to one aspect of the present invention, the VCM comprises a permanent magnet, a voice coil adapted to move in an arc proximate to the permanent magnet, a top plate positioned above the voice coil, and a bottom plate positioned below the voice coil. The top plate has a first plate portion and a second plate portion at opposite sides of a symmetry axis of the arc. The bottom plate has a first plate portion and a second plate portion at opposite sides of the symmetry axis of the arc. The first plate portion of the top plate and the second plate portion of the bottom plate are at opposite sides of the symmetry axis of the arc. The permanent magnet has two halves that are magnetized in opposite direction. The two halves of the magnet are split into a right half magnet portion and a left half magnet portion. The right half magnet portion is attached to the first plate portion of the top plate, and the left half magnet portion is attached to the second plate portion of the bottom plate.

In an embodiment of the VCM, the VCM further has a first magnetic conductive plate attached to the left half magnet portion and the first plate portion of the bottom plate, and a second magnetic conductive plate attached to the right half magnet portion and the second plate portion of the top plate. The first magnetic conductive plate is symmetrical with the left half magnet portion. The second magnetic conductive plate is symmetrical with the right half magnet portion.

According to another aspect of the present invention, the VCM comprises a permanent magnet, a voice coil adapted to move in an arc proximate to the permanent magnet, a top plate positioned above the voice coil, and a bottom plate positioned below the voice coil. The permanent magnet has two halves that are magnetized in opposite direction. The two halves of the magnet are split into a right half magnet portion and a left half magnet portion. The right half magnet portion and the left half magnet portion are attached to the top plate and the bottom plate respectively at opposite sides of the VCM.

In another embodiment of the instant VCM, the right half magnet portion and the left half magnet portion respectively have a portion overlapped each other. Preferably, the overlapped portion is 1.5 mm in width.

In still another embodiment of the instant VCM, the VCM further has a first magnetic conductive plate and a second magnetic conductive plate. The first magnetic conductive plate is positioned below the right half magnet portion to correspond to the right half magnet portion and attached to the left half magnet portion and the bottom plate, and the second magnetic conductive plate is positioned above the left half magnet portion to correspond to the left half magnet portion and attached to the right half magnet portion and the top plate.

To achieve another objective of the present invention, according to another aspect of the present invention, the hard disk drive unit comprises a head gimbal assembly, an actuator arm to connect with the head gimbal assembly, a VCM to drive the actuator arm, a disk, and a spindle motor to spin the disk. The VCM comprises a permanent magnet, a voice coil adapted to move in an arc proximate to the permanent magnet, a top plate positioned above the voice coil, and a bottom plate positioned below the voice coil. The top plate has a first plate portion and a second plate portion at opposite sides of a symmetry axis of the arc. The bottom plate has a first plate portion and a second plate portion at opposite sides of the symmetry axis of the arc. The first plate portion of the top plate and the second plate portion of the bottom plate are at opposite sides of the symmetry axis of the arc. The permanent magnet has two halves that are magnetized in opposite direction. The two halves of the magnet are split into a right half magnet portion and a left half magnet portion. The right half magnet portion is attached to the first plate portion of the top plate, and the left half magnet portion is attached to the second plate portion of the bottom plate.

According to another aspect of the present invention, the hard disk drive unit comprises a head gimbal assembly, an actuator arm to connect with the head gimbal assembly, a VCM to drive the actuator arm, a disk, and a spindle motor to spin the disk. The VCM comprises a permanent magnet, a voice coil adapted to move in an arc proximate to the permanent magnet, a top plate positioned above the voice coil, and a bottom plate positioned below the voice coil. The permanent magnet has two halves that are magnetized in opposite direction. The two halves of the magnet are split into a right half magnet portion and a left half magnet portion. The right half magnet portion and the left half magnet portion are attached to the top plate and the bottom plate respectively at opposite sides of the VCM.

Since the present VCM employs only one piece of permanent magnet, the consumption of magnet material is reduced, and accordingly the cost of the VCM and the hard disk drive unit is lowered. In addition, two halves of the permanent magnet are attached to the top and bottom plates respectively at opposite sides thereof, so the transition zone of the VCM is much smaller than that of the traditional single magnet VCM, and the vertical forces generated on two sides of the coil at opposite sides of the X-axis are in the same direction. Due to the same direction of the vertical forces, torsion generated on the coil is reduced.

Other aspects, features, and advantages of this invention will become apparent from the following detailed description when taken in conjunction with the accompanying drawings, which are a part of this disclosure and illustrate, by way of example, principles of this invention.

BRIEF DESCRIPTION OF THE DRAWINGS

The accompanying drawings facilitate an understanding of the various embodiments of this invention. In such drawings:

FIG. 1b is a partial perspective view of an actuator arm and portions of a VCM of the disk drive device shown in FIG. 1a;

FIG. 3e shows vertical forces Ft generated on the coil of the VCM shown in FIG. 3a;

FIG. 4e shows vertical forces Ft generated on the coil of the VCM shown in FIG. 4a;

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a VCM for a hard disk drive which employs only one piece of permanent magnet for reducing the cost as well as torsion in the VCM.

Figure 5:
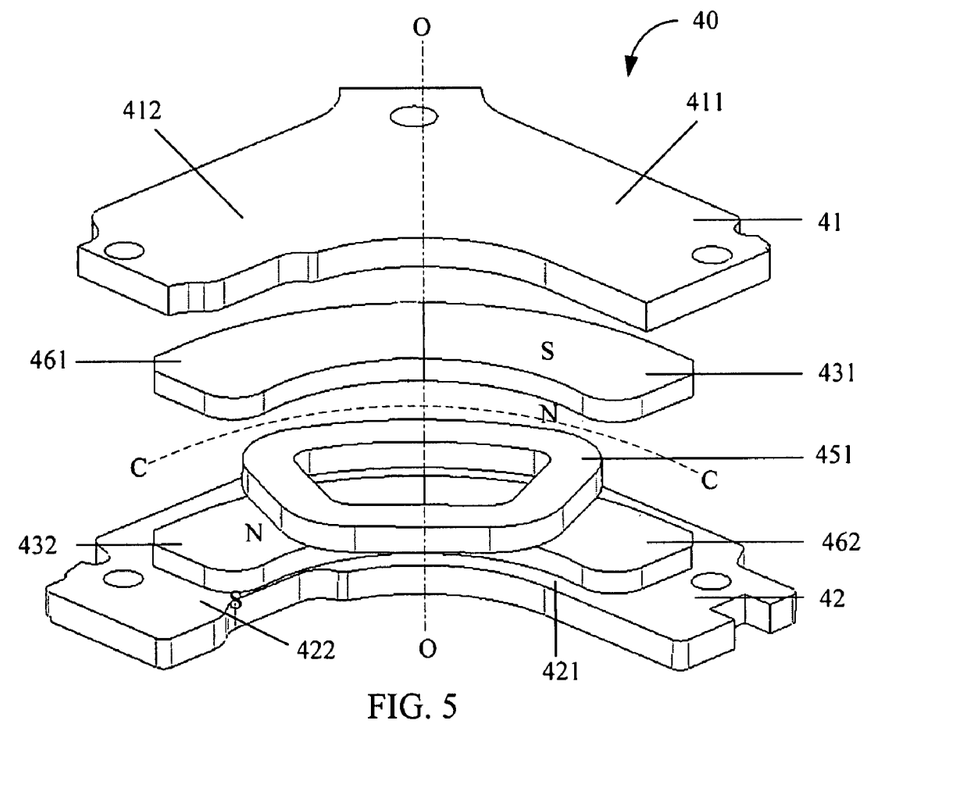
FIG. 5 is an exploded perspective view of a VCM according to an embodiment of the present invention, called split magnet VCM hereinafter.
Figure 6:
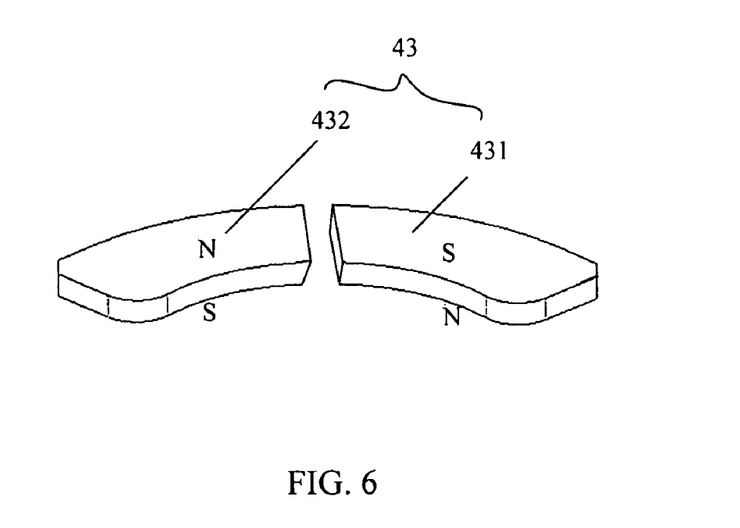
FIG. 6 is a perspective view of a permanent magnet of the VCM shown in FIG. 5.
Figure 7:
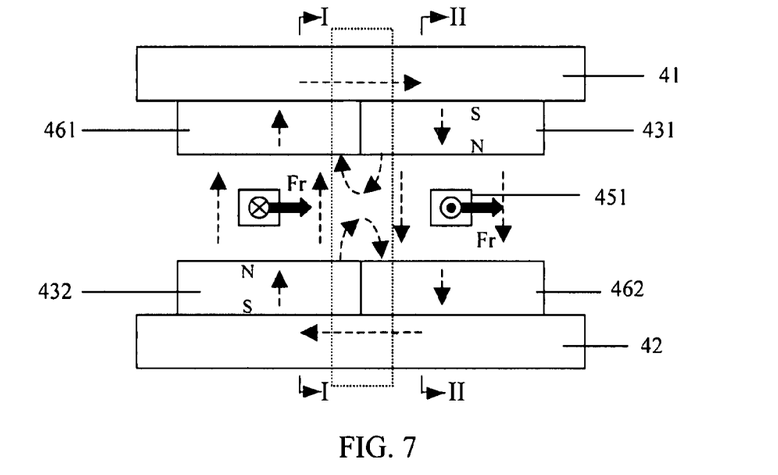
FIG. 7 is a front plan view of the split magnet VCM shown in FIG. 5, showing lines of magnetic flux.

Referring now more particularly to the accompanying drawings, FIG. 5 is an exploded perspective view of a split magnet VCM 40 according to an example embodiment of the present invention. The present VCM 40 includes a permanent magnet 43, a voice coil 451 adapted to move in an arc proximate to the permanent magnet 43, a top plate 41 positioned above the voice coil 451, a bottom plate 42 positioned below the voice coil 451, a first magnetic conductive plate 461, and a second magnetic conductive plate 462. As best shown in FIG. 7, the permanent magnet 43, the top and bottom plates 41, 42, and the magnetic conductive plates 461, 462 establish a magnetic circuit. The voice coil 451 is immersed in the magnetic field of the magnetic circuit. When current is passed through the voice coil 451, and electromagnetic field is established which interacts with the magnetic field of the magnetic circuit such that the voice coil 451 experiences rotational forces Fr in accordance with the well-known Lorentz relationship. As described previously, the voice coil 451 is radially mounted to a pivotally mounted actuator arm, so the voice coil 451 moves in an arc C-C under the rotational forces. The arc C-C has a symmetrical axis O. The symmetrical axis O divides the top plate 41 into a first plate portion 411 and a second plate portion 412, that is, the first plate portion 411 and the second plate portion 412 lie at opposite sides of the symmetry axis O of the arc C-C. Similarly, the symmetrical axis O divides the bottom plate 42 into a first plate portion 421 and a second plate portion 422, that is, the first plate portion 421 and the second plate portion 422 lie at opposite sides of the symmetry axis O of the arc C-C. The first plate portion 411 of the top plate 41 and the first plate portion 421 of the bottom plate 42 lie at the same side, and the second plate portion 412 of the top plate 41 and the second plate portion 422 of the bottom plate 42 lie at the same side. In other words, the first plate portion 411 of the top plate 41 and the second plate portion 422 of the bottom plate 42 are at opposite sides of the symmetry axis O of the arc C-C. As best shown in FIG. 6, the permanent magnet 43 has two halves 431, 432 that are magnetized in opposite direction. The two halves 431, 432 of the permanent magnet 43 are split into a right half magnet portion 431 and a left half magnet portion 432. The right half magnet portion 431 is attached to the first plate portion 411 of the top plate 41, and the left half magnet portion 432 is attached to the second plate portion 422 of the bottom plate 42. Namely, the right and left half magnet portions 431, 432 are at opposite sides of the VCM. The first magnetic conductive plate 461 is attached to the left half magnet portion 432 and the first plate portion 421 of the bottom plate 42, and the second magnetic conductive plate 462 is attached to the right half magnet portion 431 the second plate portion 412 of the top plate 41. Preferably, the first magnetic conductive plate 461 is symmetrical with the left half magnet portion 432, and the second magnetic conductive plate 462 is symmetrical with the right half magnet portion 431.

Selectively, the first and second magnetic conductive plates 461, 462 can be stamped directly from the top and bottom plates 41, 42 respectively or fabricated independently and then attached to the plates 41, 42.

FIG. 7 is a front plan view of the split magnet VCM 40 and shows lines of magnetic flux. When a predetermined driving current flows through the movable coil 451, driving forces Fr represented by the solid arrow are generated on the movable coil 451 according to the Fleming's left-hand rule by the interaction between the current and a magnetic field formed by the magnet 43 and the magnetic plates 41, 42, thereby driving the actuator arm to move. As shown in FIG. 7, the transition zone of the VCM 40 is much smaller than that of the traditional single magnet VCM 30, and the magnetic flux in the transition zone can cancel with each other, so the effect of the transition zone of the split magnetic VCM can be minimized.

Figure 7A:
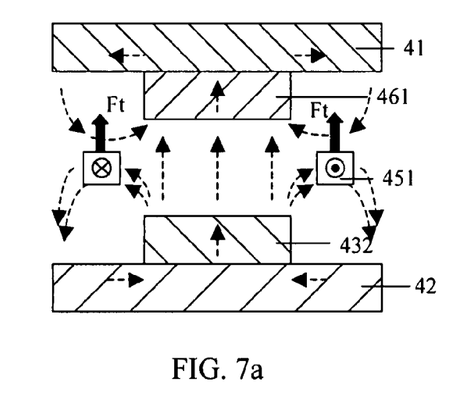
FIG. 7a is a cross-sectional view of the split magnet VCM shown in FIG. 7, taken along line I-I of FIG. 7.
Figure 7B:
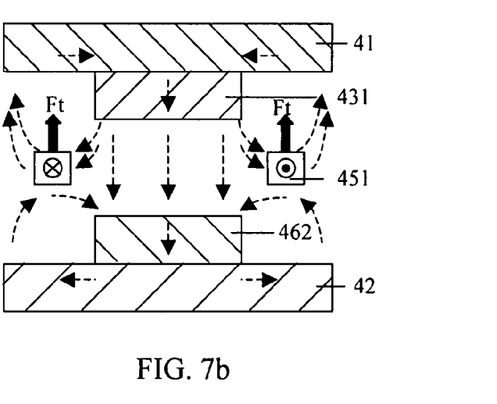
FIG. 7b is a cross-sectional view of the split magnet VCM shown in FIG. 7, taken along line II-II of FIG. 7.
Figure 8:
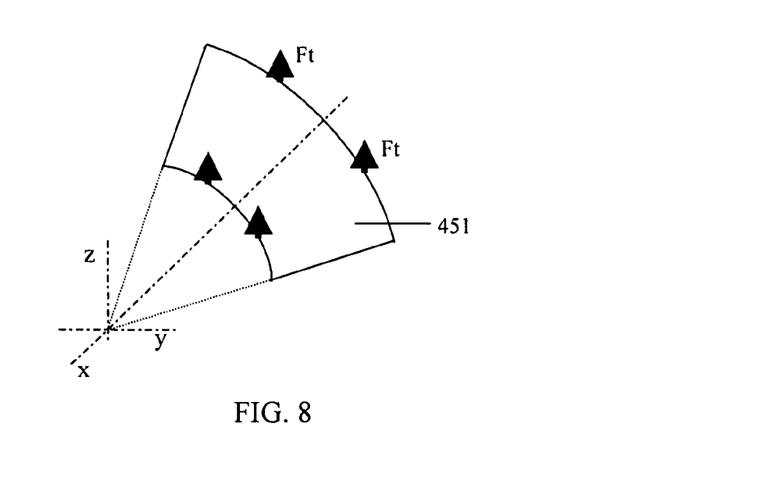
FIG. 8 shows vertical torques Ft generated on the coil of the split magnet VCM shown in FIG. 5.

Referring to FIGS. 7a-7b and FIG. 8, since the vertical forces Ft generated on the coil 451 of the VCM 40 are all in the same direction, according to Fleming's left-hand rule, and the magnitude of vertical forces Ft and the arms of the forces with respect to the x-axis are approximately equal, so almost no torsion Mx is generated on the voice coil 451. As the arms of the forces with respect to the y-axis are different, there exists pitch torque My which will cause the coil 451 to bend. Fortunately, bend of the coil is less critical in the VCM design.

Figure 9:
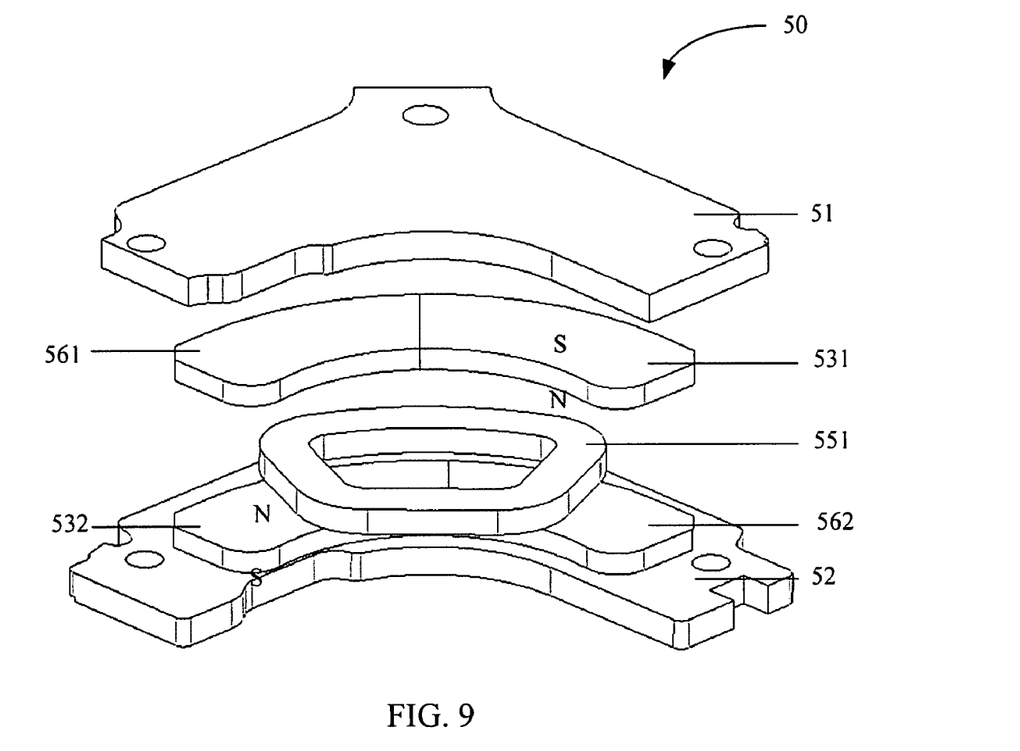
FIG. 9 is an exploded perspective view of a VCM according to another embodiment of the present invention, called overlapped split magnet VCM hereinafter.

FIG. 9 illustrates another embodiment of an overlapped split magnet VCM according to the present invention. The VCM 50 includes a permanent magnet 53, a voice coil 551 adapted to move in an arc proximate to the permanent magnet 53, a top plate 51 positioned above the voice coil 551, a bottom plate 52 positioned below the voice coil 551, a first magnetic conductive plate 561, and a second magnetic conductive plate 562. The permanent magnet 53 has two halves that are magnetized in opposite direction. The two halves of the permanent magnet are split into a right half magnet portion 531 and a left half magnet portion 532. The right half magnet portion 531 and the left half magnet portion 532 are attached to the top plate 51 and the bottom plate 52 respectively at opposite sides of the VCM 50. The first magnetic conductive plate 561 is positioned below the right half magnet portion 531 to correspond to the right half magnet portion 531 and attached to the left half magnet portion 532 and the bottom plate 52, and the second magnetic conductive plate 562 is positioned above the left half magnet portion 532 to correspond to the left half magnet portion 532 and attached to the right half magnet portion 531 and the top plate 51.

Figure 10:
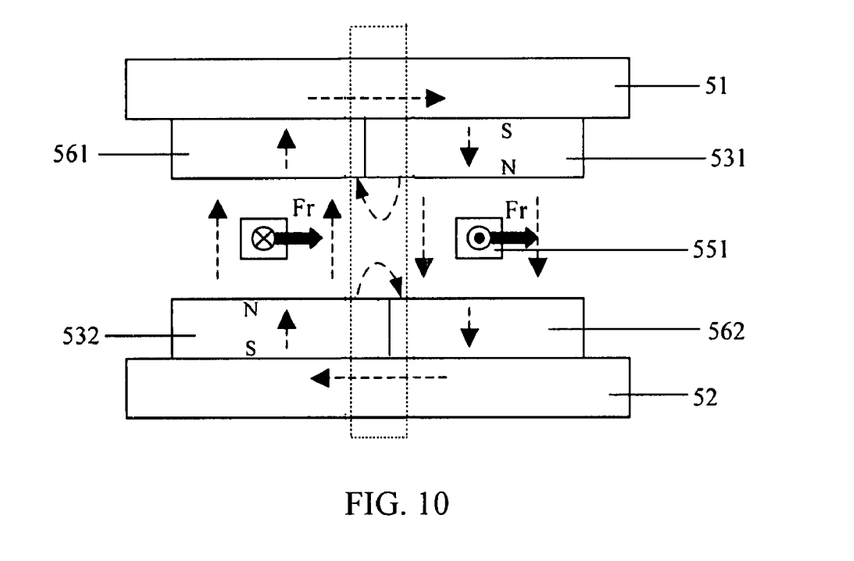
FIG. 10 is a front plan view of the overlapped split magnet VCM shown in FIG. 9, showing lines of magnetic flux.

Referring to FIGS. 9-10, the right half magnet portion 531 and the left half magnet portion 532 respectively have a portion overlapped each other. Preferably, the overlapped portion is 1.5 mm in width. As shown in FIG. 10, the transition zone of the VCM 50 is further smaller than that of the VCM 40, that is to say, the undesired torsion torque Mx generated on the coil 551 is further reduced.

FIG. 11 shows the testing data of the traditional dual magnet VCM, the conventional single magnet VCM, the present split magnet VCM, and the present overlapped split magnet VCM. These figures prove that the undesired torsion Mx has been reduced by 50 percent (6 dB reduction) in the split magnet VCM. It can be seen that the Mx of the overlapped split magnet VCM is only 1/6 (15 dB reduction) of that of the traditional single magnet VCM. That is to say, the performance of the VCM of the present invention, especially the overlapped split magnet VCM, is improved.

Figure 12:
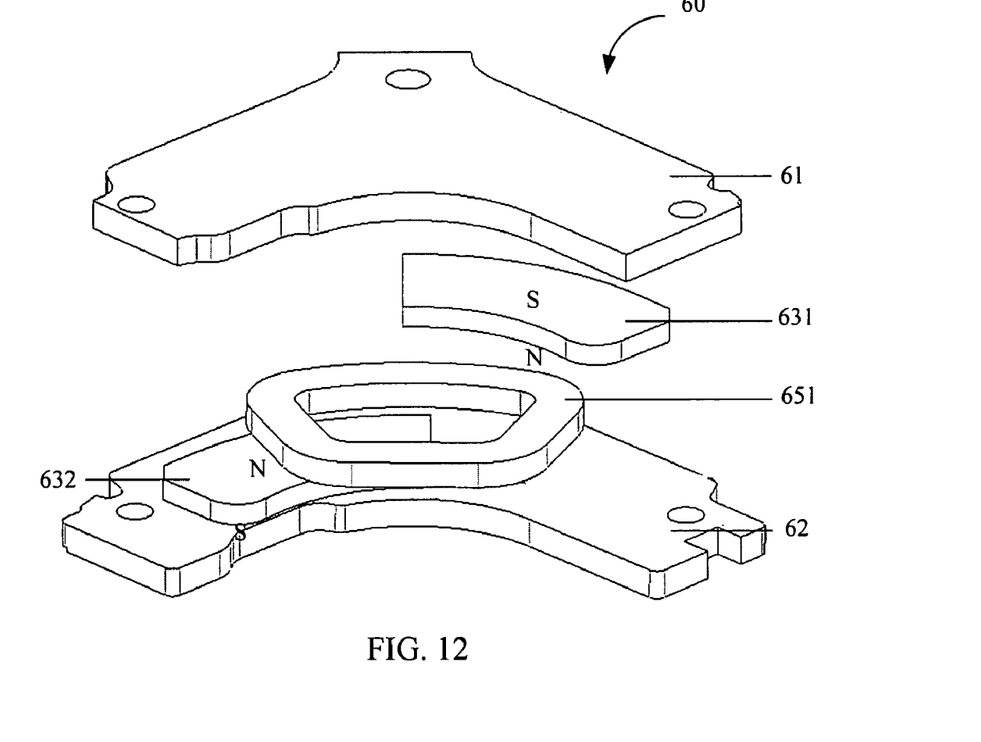
FIG. 12 is an exploded perspective view of a VCM according to still another embodiment of the present invention.

FIG. 12 shows another embodiment of the VCM according to the present invention. Referring to FIG. 9 and FIG. 12, the difference between the VCM 50 and VCM 60 is that the latter one removes the first magnetic conductive plate 561 and the second magnetic conductive plate 562 to further reduce the cost of the VCM. The VCM 60 comprises a top plate 61, a bottom plate 62, two split magnet halves 631, 632 attached to the top and bottom plates 61, 62 respectively at opposite sides thereof, and a voice coil 651 between the two split magnet halves 631, 632. Such structure can also reduce its transition zone, and torsion in the VCM 60 is able to be reduced relative to the traditional single magnet VCM.

Figure 13:
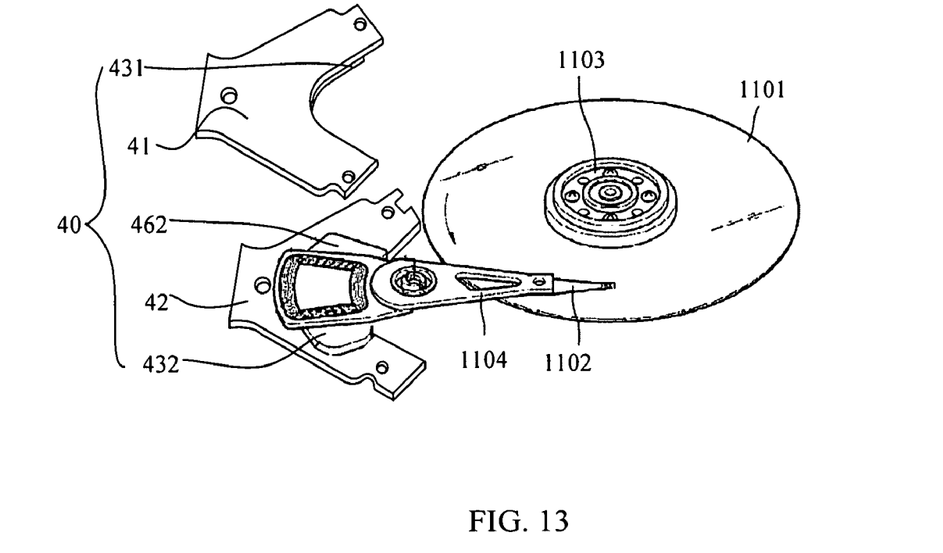
FIG. 13 is a perspective view of a hard disk drive unit with the VCM according to the present invention.

As shown in FIG. 13, according to an embodiment of the present invention, a disk drive unit can be attained by assembling a disk 1101, a spindle motor 1103 for spinning the disk, a HGA 1102 that carries a head at a tip end thereof, a pivotally mounted actuator arm 1104 to connect with the HGA 1102, and the VCM 40, 50 or 60 of the present invention with its voice coil attached to the actuator arm 1104. Because the structure and the assembly process of disk drive unit are well known to persons ordinarily skilled in the art, a detailed description of such structure and assembly is omitted herefrom.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A voice coil motor for a disk drive comprising:
    a permanent magnet;
    a voice coil adapted to move in an arc proximate to the permanent magnet;
    a top plate positioned above the voice coil, the top plate having a first plate portion and a second plate portion at opposite sides of a symmetry axis of the arc; and
    a bottom plate positioned below the voice coil, the bottom plate having a first plate portion and a second plate portion at opposite sides of the symmetry axis of the arc;
    wherein the first plate portion of the top plate and the second plate portion of the bottom plate are at opposite sides of the symmetry axis of the arc;
    wherein the permanent magnet has two halves that are magnetized in opposite direction, the two halves of the permanent magnet are split into a right half magnet portion and a left half magnet portion, the right half magnet portion is attached to the first plate portion of the top plate, and the left half magnet portion is attached to the second plate portion of the bottom plate,
    wherein a first magnetic conductive plate is attached to the left half magnet portion and the first plate portion of the bottom plate.

2. The voice coil motor as claimed in claim 1, wherein the first magnetic conductive plate is symmetrical with the left half magnet portion.

3. The voice coil motor as claimed in claim 1, further comprising a second magnetic conductive plate attached to the right half magnet portion and the second plate portion of the top plate.

4. The voice coil motor as claimed in claim 3, wherein the second magnetic conductive plate is symmetrical with the right half magnet portion.

5. A voice coil motor for a disk drive comprising:
    a permanent magnet;
    a voice coil adapted to move in an arc proximate to the permanent magnet;
    a top plate positioned above the voice coil; and
    a bottom plate positioned below the voice coil;
    wherein the permanent magnet has two halves that are magnetized in opposite direction, the two halves of the permanent magnet are split into a right half magnet portion and a left half magnet portion, the right half magnet portion and the left half magnet portion are attached to the top plate and the bottom plate respectively at opposite sides of the voice coil motor, wherein a first magnetic conductive plate is positioned below the right half magnet portion to correspond to the right half magnet portion and is attached to the left half magnet portion and the bottom plate.

6. The voice coil motor as claimed in claim 5, wherein the right half magnet portion and the left half magnet portion respectively have a portion overlapped with each other.

7. The voice coil motor as claimed in claim 6, wherein the overlapped portion is 1.5 mm in width.

8. The voice coil motor as claimed in claim 5, further comprising a second magnetic conductive plate positioned above the left half magnet portion to correspond to the left half magnet portion and attached to the right half magnet portion and the top plate.

9. A disk drive unit comprising:
a head gimbal assembly;
an actuator arm to connect with the head gimbal assembly;
a voice coil motor to drive the actuator arm;
a disk; and
a spindle motor to spin the disk;
wherein the voice coil motor comprises:
   a permanent magnet;
   a voice coil attached to the actuator arm and adapted to move in an arc proximate to the permanent magnet;
   a top plate positioned above the voice coil, the top plate having a first plate portion and a second plate portion at opposite sides of a symmetry axis of the arc; and
   a bottom plate positioned below the voice coil, the bottom plate having a first plate portion and a second plate portion at opposite sides of the symmetry axis of the arc;
wherein the first plate portion of the top plate and the second plate portion of the bottom plate are at opposite sides of the symmetry axis of the arc;
wherein the permanent magnet has two halves that are magnetized in opposite direction, the two halves of the magnet are split into a right half magnet portion and a left half magnet portion, the right half magnet portion is attached to the first plate portion of the top plate, and the left half magnet portion is attached to the second plate portion of the bottom plate,
wherein a first magnetic conductive plate is attached to the left half magnet portion and the first plate portion of the bottom plate.

10. The disk drive unit as claimed in claim 9, wherein the first magnetic conductive plate is symmetrical with the left half magnet portion.

11. The disk drive unit as claimed in claim 9, further comprising a second magnetic conductive plate attached to the right half magnet portion and the second plate portion of the top plate.

12. The disk drive unit as claimed in claim 11, wherein the second magnetic conductive plate is symmetrical with the right half magnet portion.

13. A disk drive unit comprising:
a head gimbal assembly;
an actuator arm to connect with the head gimbal assembly;
a voice coil motor to drive the actuator arm;
a disk; and
a spindle motor to spin the disk;
wherein the voice coil motor comprises:
   a permanent magnet;
   a voice coil attached to the actuator arm and adapted to move in an arc proximate to the permanent magnet;
   a top plate positioned above the voice coil; and
   a bottom plate positioned below the voice coil;
wherein the permanent magnet has two halves that are magnetized in opposite direction, the two halves of the magnet are split into a right half magnet portion and a left half magnet portion, the right half magnet portion and the left half magnet portion are attached to the top plate and the bottom plate respectively at opposite sides of the voice coil motor,
wherein a first magnetic conductive plate is positioned below the right half magnet portion to correspond to the right half magnet portion and is attached to the left half magnet portion and the bottom plate.

14. The disk drive unit as claimed in claim 13, wherein the right half magnet portion and the left half magnet portion respectively have a portion overlapped with each other.

15. The disk drive unit as claimed in claim 14, wherein the overlapped portion is 1.5 mm in width.

16. The disk drive unit as claimed in claim 13, further comprising a second magnetic conductive plate positioned above the left half magnet portion to correspond to the left half magnet portion and attached to the right half magnet portion and the top plate.

* * * * *